United States Patent [19]

Volk, Sr.

[11] E Patent Number: Re. 31,979

[45] Reissued Date of Patent: Sep. 3, 1985

[54] METHOD OF HULLING PISTACHIO NUTS

[75] Inventor: Joseph Volk, Sr., Gilroy, Calif.

[73] Assignee: Benjamin Volk, Gilroy, Calif.

[21] Appl. No.: 659,290

[22] Filed: Oct. 10, 1984

Related U.S. Patent Documents

Reissue of:

[64] Patent No.: 4,353,931
Issued: Oct. 12, 1982
Appl. No.: 275,263
Filed: Jun. 19, 1981

[51] Int. Cl.[3] ..... A23N 5/00

[52] U.S. Cl. ..... 426/483; 99/574

[58] Field of Search ..... 426/482, 483, 481, 479; 99/568, 574, 617, 623

[56] References Cited

U.S. PATENT DOCUMENTS

| | | | |
|---|---|---|---|
| 801,593 | 10/1905 | Ireland | 99/575 |
| 1,257,306 | 2/1918 | Blatt | 99/575 |
| 1,274,803 | 8/1918 | Spitz | 426/483 |
| 1,377,090 | 5/1921 | Morris | 99/625 |
| 1,427,000 | 8/1922 | Lewinski | 426/482 |
| 1,791,362 | 2/1931 | La Forge | 99/625 |
| 1,827,736 | 10/1931 | Coari | 99/575 |
| 1,834,347 | 12/1931 | Nixon | 99/579 |
| 2,355,810 | 8/1944 | Loewy | 426/483 |
| 2,433,730 | 12/1947 | Bridge | 99/625 |
| 3,303,864 | 2/1967 | Bailey, Jr. | 99/574 |
| 4,034,665 | 7/1977 | McFarland et al. | 99/574 |
| 4,183,967 | 1/1980 | Nelson et al. | 426/482 |

*Primary Examiner*—George Yeung
*Attorney, Agent, or Firm*—Richard A. Brown

[57] ABSTRACT

A pistachio huller is provided wherein a means having projections pushes unhulled nuts between the surface of the means having projections and a surface of a means having slots, the slots being narrower than the pistachio nuts to be hulled. The projections protrude into the slots and the hulls are ruptured and abraded through contact between the surface of the means with projection and the surface of the strips forming the means having slots whereby the nuts are hulled.

3 Claims, 9 Drawing Figures

METHOD OF HULLING PISTACHIO NUTS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a huller for the removal of the hull containing a pistachio nut. My invention finds particular application as a pistachio huller. In particular my invention is directed to a method and apparatus for a huller which ruptures and abrades the hull containing a pistachio nut.

2. Description of the Prior Art

The current methods and apparatuses in use for pistachio dehulling work adequately and are primarily wet process hullers using large volumes of water.

It is noted, in U.S. Pat. No. 4,304,665 by Jay J. McFarland and Bertram E. Saunder for a "Pistachio Huller" that the pistachio industry has grown commercially in the San Joaquin Valley of the State of California during recent years with substantial acreage of this delicious nut being planted. These plantings are now in production and without the cheap labor of foreign countries it is not economically feasible to hull the harvested pistachios by hand. Noted in that patent is the statement that insofar as they could determine, prior to their invention, there had never been a practical mechanical huller for pistachios. The McFarland, et al patent discloses a two stage huller, the first stage to rupture the pericarps and to remove a portion of the hull and a second stage to strip the remaining portion of the pericarp from the shells. This patent discusses one embodiment used in connection with water wherein a water nozzle provides water to moisten and soften the pericarp and to rinse the fragments of pericarp from the shell. This type of prior art huller, in application, is water assisted. As in other prior art hullers substantial amounts of water are used. As will be described in greater detail hereinbelow, my invention is a method and apparatus for the dry hulling of pistachio nuts and is directed to overcome the necessity for the use of water while hulling pistachio nuts and other associated problems of the prior art.

It was in the late 1960's and early 1970's that most of 31,000 acres of pistachios were planted in the San Joaquin Valley of the State of California, that 1977 saw the first crop of California's pistachios, and that with little knowledge the questions then asked were: Now that we have them what do we do with them? How do we process them? More importantly, how do we hull them? My invention described hereinbelow answers the latter questions.

Further, the hulling of pistachio nuts is known to present unusual problems. The hulls must be promptly removed after harvest or discoloration to the pistachio shell will occur within 24 hours and damage to the nut can result if the pistachio hull is not promptly removed after harvest. More commercial pistachio shells are dyed pink or red to hide this discoloration. The hull of the pistachio is stronger than most nuts and has a greater adherence to the shell than most nuts and it is therefore more difficult to remove.

SUMMARY OF THE INVENTION

In accordance with the present invention, an apparatus is provided for removing the hull containing a pistachio nut which comprises: a support means; a means having slots attached to the support means; a means having projections disposed on a surface thereof with the projections being spaced apart on the surface and the surface movably mounted on the support means with the surface having projections disposed in close proximity to the surface of the means having slots so that the projections extend into the slots; a means for moving the surface having projections coupled to the means having a plurality of projections so as to pass at least one of the projections into each of the slots; and a means for dispensing pistachio nuts to be hulled in abrading engagement between the surface of the means having slots and the surface having projections.

The invention further comprising a method of removing a hull containing a pistachio nut the method comprising the steps of depositing an unhulled pistachio nut between a means having slots, the slots being narrower than the pistachio nuts, and a means having projections extending outward from a surface thereof, of passing the unhulled pistachio nut between the surface having projections and the surface of the means having slots by means of moving the surface of the means having projections, so as to push the nut in said slots with the projections, and of abrading the hull from the pistachio nut by means of the surface having projections and the surface of the means having slots contacting the hull while the unhulled pistachio nut passes between the surface having projections and the surface of the means having slots.

It is accordingly an object of the present invention to provide a huller capable of dry processing of pistachios without breaking many of the shells or damaging the nuts.

Another object of the present invention is to provide a huller, that once adjusted, is operable despite the variation in size of the pistachio nuts being hulled and a huller that can handle all sizes of pistachio nuts from the field run harvest.

Another object of the present invention is to provide a huller that is easily portable and can be used at harvest in the orchard.

Another object of the present invention is to provide a huller that uses very little power for the volume of product processed, is economical, efficient and effective for hulling the field run harvest of pistachio nuts.

Another object of the present invention is to provide a huller wherein the hulls after separation from the shells are available for animal feed.

Another object of the present invention is to provide a huller wherein the high quality flavor of the pistachio nut is not tainted by disagreeable flavors as may result from the water separation processes.

Another object of the present invention is to provide a huller which is self-cleaning and has a roller and means with slots that are easily replaced or repaired.

Yet another object of the present invention is to provide a huller which is easily adjustable to permit the huller to dehull pistachio nuts of different sizes during its normal operation.

BRIEF DESCRIPTION OF THE DRAWINGS

In the drawings forming a part of the specification like reference numerals are employed to designate like parts throughout the same.

DESCRIPTION

Figure 1:
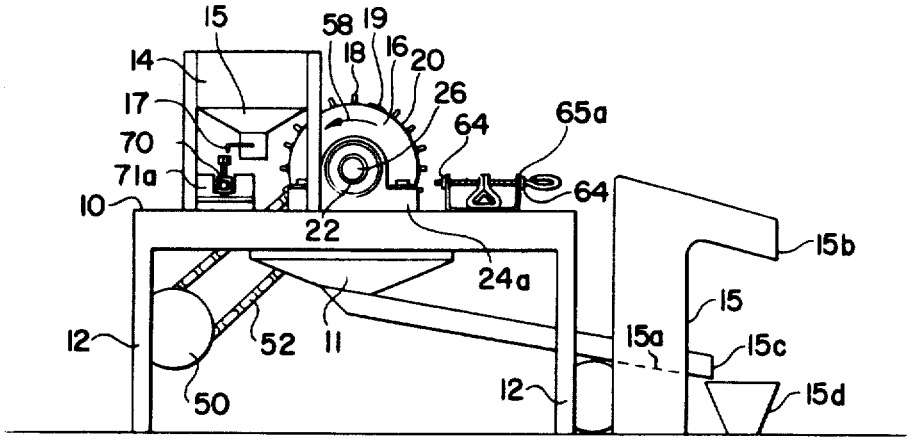
FIG. 1 is a side elevation view of the huller of the preferred embodiment of the present invention.
Figure 2:
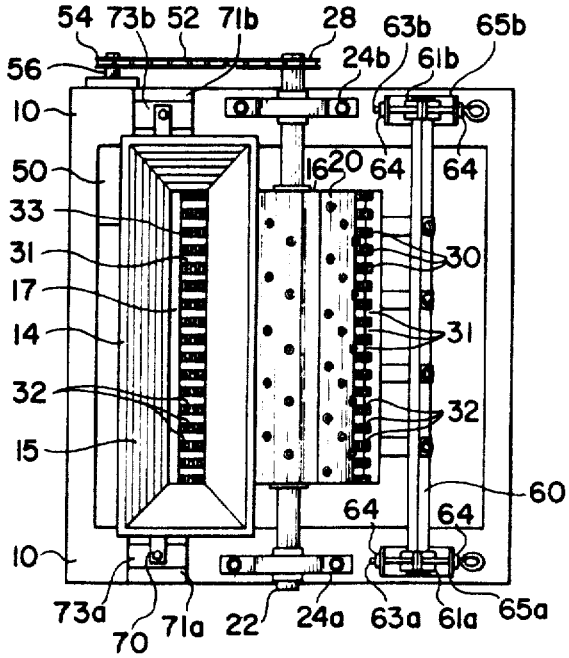
FIG. 2 is a top planar view of the huller of the preferred embodiment of the present invention without the hopper, air separator, or shoot.

Referring now to the drawings and in particular to FIGS. 1 and 2 a side elevation view and a top plan view, respectively, of the preferred embodiment of the huller of my invention are shown. A frame 10 is supported by uprights 12, frame 10 supports a hopper 14 for dispensing unhulled pistachio nuts to be hulled between a drum 16 and a base 30 having slots 31. The drum 16 has projections 18 disposed outwardly on the peripheral surface 20 thereof. The peripheral surface 20 is normally made of metal or other non-flexible material, however, a hard rubber or similar non-metal surface will suffice for the peripheral surface 20. Sweep 19 is attached to the peripheral surface 20 and extends the length of the cylinder 16 and is parallel to the axis 26 of the cylinder 16. Sweep 19 extends outwardly from the periphery 20 a short distance but does not extend as far as the pins 18.

The drum 16 is mounted on a shaft 22 extending through the center of the cylinder 16. The shaft 22 is journaled to frame 10 through suitable journals 24a and 24b which journals support the driving shaft 22. The shaft 22 is designed to rotate about a transverse horizontal axis 26. Attached to the upright 12 is an electric motor 50 and a driving belt 52 which couples sprocket 54 attached to shaft 56 of the motor 50 and the sprocket 28 attached to the shaft 22. In operation the rotation of the drum 16 is in the direction indicated by the arrow 58.

The hopper 14 is provided to receive the unhulled pistachio nuts and is mounted to frame 10. The hopper has an elongated shoot 15 and a gate 17 which controls the passage of the unhulled nuts to be abraded between the peripheral surface 20 of the cylinder 16 and the base 30. The means 30 and its supporting structure for coupling the means 30 to frame 10 is shown in detail in FIGS. 4 and 5 and is described in particular therein.

The rotary drum 16 mounted above base 30 coacts with the semi-flexible base 30 to push the nuts along the slots 31 formed within the base 30. The base 30 consists of a series of parallel semi-elastic strips 32 which are serrated on their upper surface 33 which contacts the hulls of the pistachio nuts. The pins 18 embedded in the surface 20 of the drum 16 force the nuts along the channels 31 in ordered sequence to avoid the simultaneous passage of nuts through adjacent slots 31. As the nuts pass along the surface 33 while the nuts are in the slots 31 they are dehulled by the compressive force generated between the drum 16 and the base 30. The dehulled nuts and loose hulls are ejected from the base by the drum pins 18 and sweep 19. Once ejected the product enters shoot 11 and passes through the air separator 15. Air blowing past the screen 15a of air separator 15 causes the hulls to be blown out opening 15b while the pistachio nuts drop out opening 15c into the container 15d. The term "pistachio nuts" as used herein, means the nut of the pistachio tree comprising the shell containing an oblong edible seed.

Figure 3:
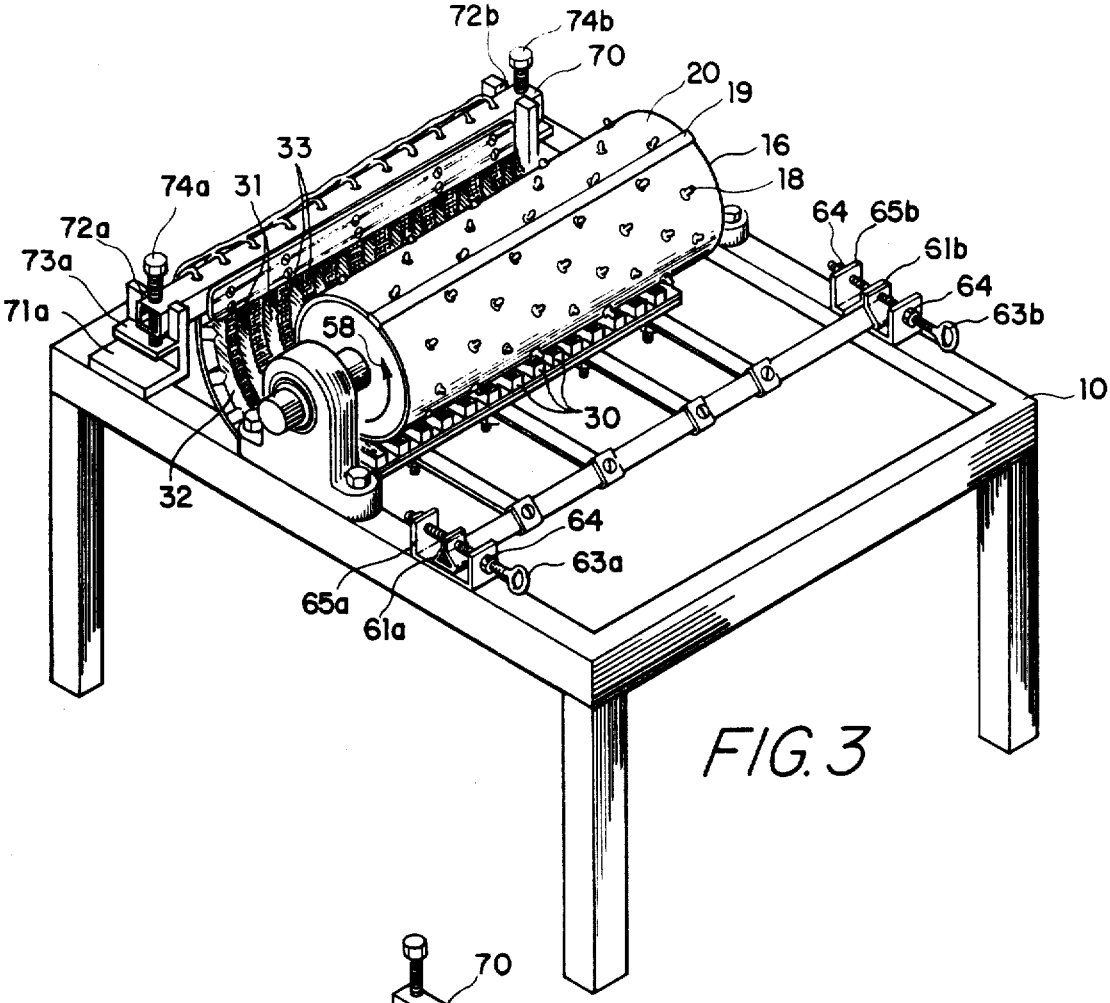
FIG. 3 is a perspective view of the huller shown in FIG. 1 and FIG. 2 without the hopper, air separator or shoot.

Referring now to FIG. 3, a perspective view of the preferred embodiment of the present invention is shown without hopper 14, air separator 15 or shoot 11. In normal operation the distance of the surface 33 of strips 32 from the peripheral surface 20 must be adjusted to a desired spacing so that the unhulled pistachio nuts contact peripheral surface 20 and the surface 33, as the unhulled pistachio nuts of most commercial harvest runs vary in size. Also, that distance must be adjusted as the pins 18 extending outwardly and perpendicular to the peripheral surface 20 of the drum 16 should extend into the slots 31 formed by the strips 32 to push the pistachio nut passing between said surface 20 and said surface 33 when the drum 16 is rotated in the direction indicated by arrow 58. One end of strips 32 are coupled to bar 70 and the other ends thereof are supported by a wire mesh 39 which is coupled to a bracket 60 through metal strips 40 as more fully described hereinbelow. This adjustment of distance between the periphery 20 and the surface of the strips 32 is accomplished by the horizontal movement of bracket 60 and the vertical movement of square bar 70.

Bracket 60 is held by a threaded clamp 61a and 61b through the adjusting screws 63a and 63b, respectively, passing through clamps 61a and 61b. The screws 63a and 63b are secured by nuts 64 to the sides of U-brackets 65a and 65b, which U-brackets are in turn attached to frame 10. The turning of the screws 63a and 63b causes the threaded clamps 61a and 61b, respectively, secured to the bracket 60 to move the bracket 60 horizontally on frame 10. Thus through the horizontal movement of bracket 60 of the surface 33 the strips 32 of the means 30 can be brought closer to or moved farther away from the peripheral surface 20 of the drum 16. Also, attached to the frame 10 are L-bracket 71a and 71b having rectangular slots 72a and 72b respectively therein. Brackets 71a and 71b have a flange 73a and 73b respectively which flanges are perpendicular to the frame 10. The ends of the bolts 74a and 74b pass through the threaded holes of square bar 70 near the ends of square bar 70 with bolts 74a and 74b resting on the flanges 73a and 73b respectively. The turning of the bolt 74a and 74b in the threaded holes of square bar 70 vertically raises or lowers the bar 70 within the slots 72a and 72b to adjust the surface 33 of the strips 32 of the means 30 closer or farther from the peripheral surface 20 of the drum 16. Thus movement of the bracket 60 and the bar 70 will change the spaced relationship of the surface 33 with the surface 20 of the drum 16.

In operation the hopper 14, not shown in FIG. 3, dispenses unhulled nuts between means 30, formed in part of strips 32 to provide slots 31, and the surface 20 of the drum 16 with the drum disposed above and in close proximity to surface 33. The unhulled pistachio nuts fall onto the serrated surface 33 of the strips 32 and then partially into the slots 31 which slots are spaced apart at a distance smaller than the shell of the pistachio nuts to be dehulled, yet the slots 31 are wide enough for the nuts to rest in the slots 31. The nuts, as they are pushed by pins 18 when drum 16 is rotated in the direction of arrow 58, are abraded by compressive contact between peripheral surface 20 and surface 33 as is more particularly described hereinbelow. The sweep 19 on each rotation of the drum 16 cleans and sweeps the fragments of the ruptured hulls from between the surface 20 and the surface 33.

Figure 4:
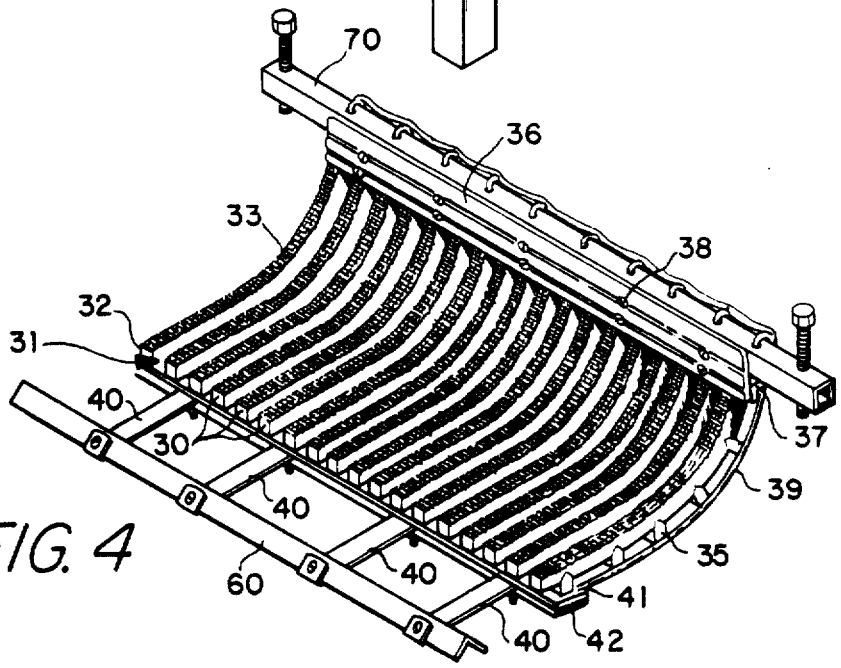
FIG. 4 is a top perspective view of the means having slots and its supporting structure employed in the preferred embodiment shown in FIGS. 1, 2 and 3.
Figure 5:
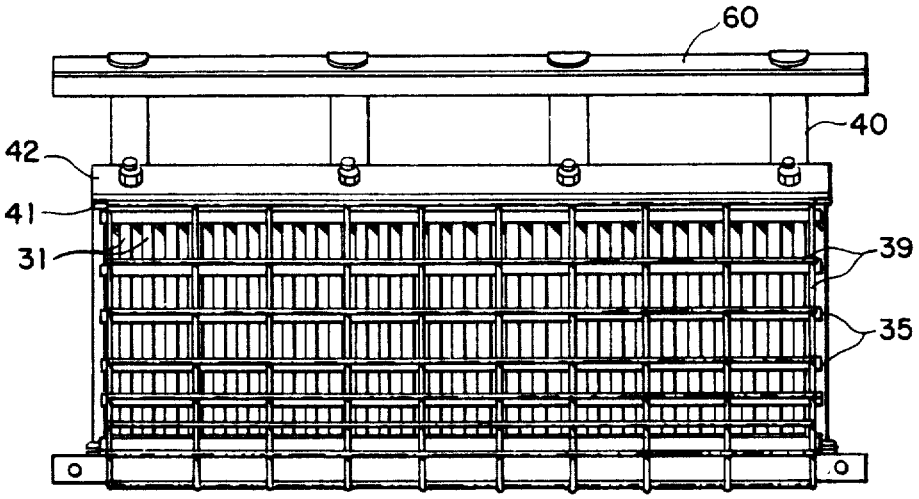
FIG. 5 is a bottom view of the means having slots and its supporting structure employed in the embodiment shown in FIGS. 1, 2 and 3.

Referring now to FIGS. 4 and 5, a top perspective view and a bottom view of the base 30 having slots 31 and its supporting structure, respectively, are shown. Base 30 consists of a series of parallel yielding strips 32 which are semi-flexible and have serrations on the surface 33 thereof. The strips 32 are retained in parallel position by semi-flexible backing strips 35 which extend across the bottom of the strips 32 and are attached to the surface opposite to surface 33 of strips 32. These strips 32 are retained in parallel position by back strips 35 and are separated from each other to form slots 31 therebetween. The semi-elastic combination formed from strips 32 and back strips 35 has one end of strips 32 fastened between braces 36 and 37 by bolts 38 extending through braces 36 and 37 and the bolts 38 also pass through square bar 70. Also, attached to square bar 70 is one end of a rectangular screen mesh 39. Wire mesh 39 is formed in an arc to provide a back support for the base 30, to support the other end of strips 32 and to assist in maintaining serrated surface 33 of the strips 32 in close proximity to drum surface 20. The other end of the wire mesh 39 is coupled to a first end of metal strips 40 by means of braces 41 and 42. The second end of metal strips 40 are attached to bracket 60. I have found that the strips 32 and the strips 35 may be formed from a polyvinylchloride material. I have also found for the hulling of pistachio nuts, a width of approximately one-fourth of an inch (approximately 63.5 millimeters) for the serrated surface 33 is particularly effective when the strips 32 are formed in parallel relationship to each other on five-eighths of an inch centers (approximately 1.53 centimeters centers) to provide slots 31 of approximately one-fourth inch in width (approximately 63.5 millimeters).

Figure 6:
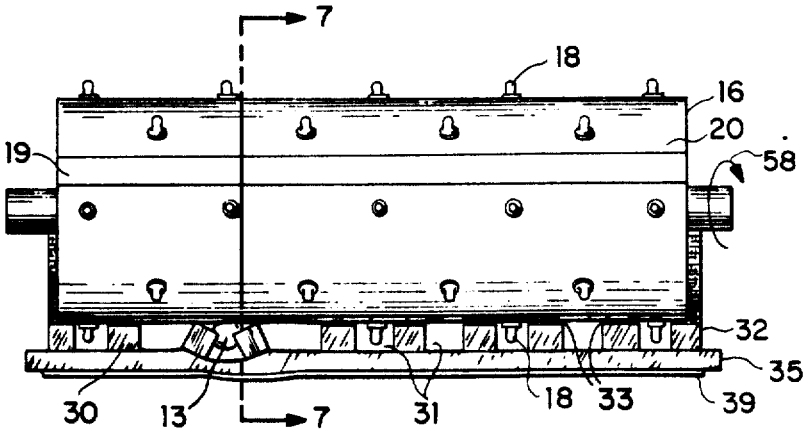
FIG. 6 is a fragmentary view of the cylinder and means having slots of the embodiment shown in FIGS. 1, 2 and 3.

Now referring to FIG. 6, a side view of a drum 16 and fragmentary view of base 30 is shown. In normal operation, as the drum 16 rotates in the direction of the arrow 58 the pins 18 pass through the slots 31. The unhulled nut, such as pistachio nut 13, being pushed by one of the pins 18, not shown, is forced to pass between the surface 20 of the cylinder 16 and the surface 33 of the strips 32 which strips are adjacently spaced in close proximity to each other at a distance narrower than the width of the nut 13. The rubbing and abrading action of the serrated surface 33 and the drum surface 20 on the hull of the pistachio nut 13 ruptures and the hull is stripped away from the nut 13. As the nut 13 is forced between the peripheral surface 20 and the yielding surfaces 33 of adjacent yielding strips 32, both of which are in contact with the nut 13 the strips 32 yield slightly and separate slightly to allow the nut 13 to pass. The amount of yielding and separating of strips 32 is dependent upon the size of the pistachio nut. After the nut 13 has passed any given position of the surfaces 33 that portion of strips 32 then returns to their normal position. The pins 18 are spaced apart and staggered on surface 20 in an ordered sequence to avoid the simultaneous passage of nuts through adjacent slots 31. With this arrangement once the proper compressive force for dehulling is set between surface 33 and surface 20 pistachio nuts of varying sizes can be dehulled without the necessity for further adjustment to the various size pistachio nuts from the field run harvest.

Figure 7:
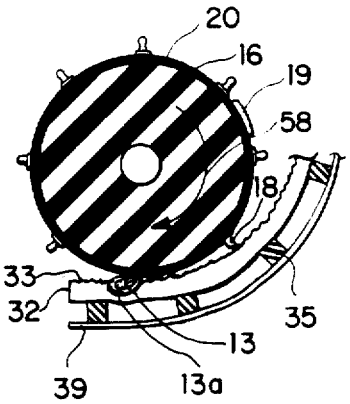
FIG. 7 is a cross section of the drum and a fragmentary section of the means having slots along the line 7—7 in FIG. 6 looking at the arrow.

Referring now to FIG. 7, a cross section of cylinder 16 and a fragmentary section of means 30, along the line 7—7 is shown. The fragmentary section of means 30, as shown consist of a portion of the flexible strip 32, a cross section of the flexible back strips 35, and a portion of support wire 39. In operation as the cylinder 16 is rotated in the direction indicated by arrow 58 pin 18 pushes the nut 13, with the hull 13a in contact with peripheral surface 20 and serrated surface 33. These contacts with the hull 13a of the pistachio nut 13 rupture the hull 13a and abrades the hull 13a from the pistachio nut 13. The fragments of hull 13a after the hull is abraded and removed from the nut 13 either fall through the slots 31, not shown, or are ejected with the nut at the end of the strip 32 by the projection 18 or the sweep 19. The wire mesh 35 in addition to providing support for the strip 32 as the nut 13 passes, between the peripheral surface 20 and the surface 33 of the strip 32 is so constructed to allow the fragments of hull 13a to pass through the opening in the wire mesh 35.

Figure 8:
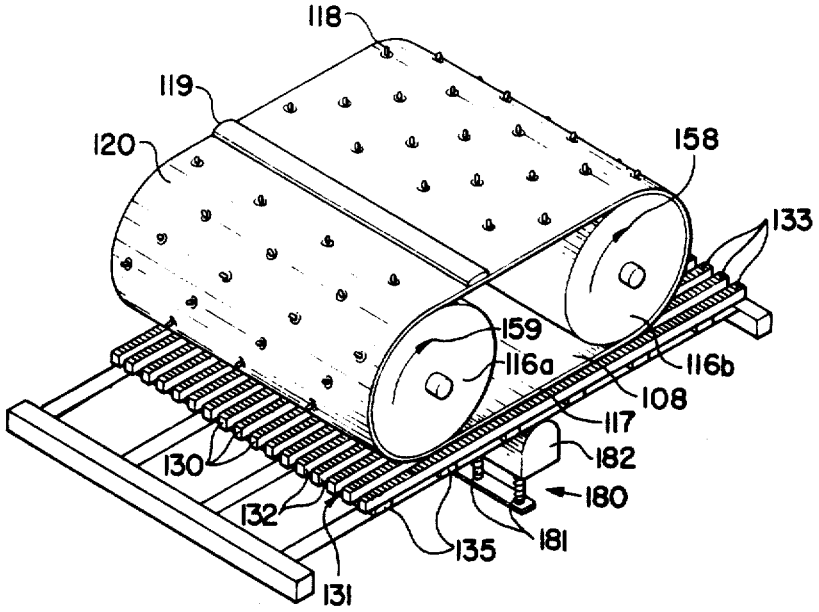
FIG. 8 illustrates a perspective view of a portion of another embodiment of this invention in the form of a belt with projections and means having slots.
Figure 9:
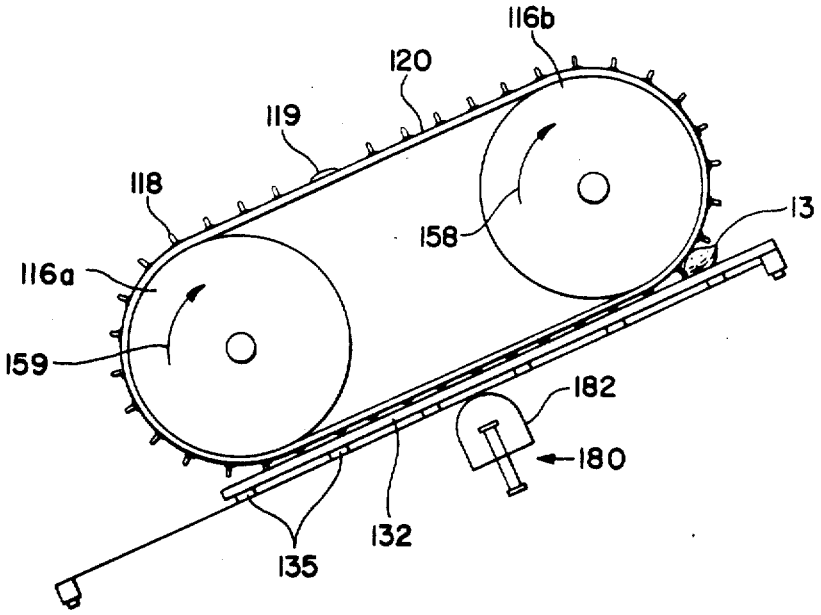
FIG. 9 illustrates a side elevation view of the embodiment shown in FIG. 8.

Referring now to FIGS. 8 and 9, a portion of another embodiment of the present invention is illustrated wherein only the coacting elements that hull the pistachio nuts are shown. The other portions of this embodiment are conventional, are known in the art, or are discussed above in conjunction with the preferred embodiment.

Briefly, in this embodiment, trained around the drums 116a and 116b is an inner surface 108 of a belt 117. The belt 117 has an outer surface 120 with outwardly extending projections 118 embedded in said surface 120. The surface 120 is located above and in close proximity to surfaces 133 of the strips 132 of base 130 having slots 131. The means 130 having slots 131 consists of a series of parallel semi-elastic strips 132 which strips have serrated surfaces 133 which contact the nuts. The strips 132 are retained in parallel position by back strips 135 and are separated from each other to form slots 131 therebetween. The slots 131 are so spaced apart to be narrower than the width of the pistachio nut to be hulled yet wide enough for said nut to rest in slot 131.

As the drums 116a and 116b are rotated in the direction of the arrows 158 and 159, respectively, the pins 118 embedded in the surface 120 force the nuts 13 through the channels 131 in an ordered sequence to avoid simultaneous passage of nuts through adjacent channels. As the nuts 13 pass through the channels 131 they are hulled by the compressive force generated between the surface 120 and the surface 133.

Tension device 180 is positioned below means 130 and in contact with the means 130. The springs 181 of tension means 180 forces a member 182 against means 130 to urge the strip 132 toward belt 117 to maintain a compressive force on the hulls of the nuts 13 passing between surface 120 and serrated surface 133. The hulled nuts and the loose hulls are ejected from the means 130 by the pins 118 or the clean sweep 119 which is attached to surface 120. Once ejected the produce enters a conventional air separator, not shown, and the hulls are blown away from the nuts.

I claim:

1. A method of removing hulls from pistachio nuts said method comprising the steps of (a) depositing unhulled pistachio nuts between rotating means having projections extending outward from a surface thereof and a means having slots, said projections being spaced apart on said surface and said surface movably mounted on support means with said surface having projections disposed in close proximity to [the] *a* surface of said means having slots so that the projections extend into the slots, said slots being narrower than the pistachio nuts;

(b) passing said unhulled pistachio nuts between the surface having projections and [a] *the* surface of said means having slots by means of moving the surface of said means having projections, so as to push said pistachio nuts in said slots with said projections; and (c) abrading said hulls from said pistachio nuts by means of the surface having projections and the surface of said means having slots contacting said hulls while said unhulled pistachio nuts pass between said surface having projections and said surface of said means having slots.

2. A method of removing hulls from pistachio nuts said method comprising the steps of:

(a) depositing unhulled pistachio nuts between rotating drum having projections extending outward from the peripheral surface of said drum and a means having slots, said projections being spaced apart on said surface and said surface movably mounted on support means with said surface having projections disposed in close proximity to [the] *a* surface of said means having slots so that the projections extend into the slots, said slots being narrower than said pistachio nuts;

(b) passing said unhulled pistachio nuts between said peripheral surface and [a] *the* surface of said means having slots by means of rotating said drum, so as to push said pistachio nuts in said slots with said projections; and (c) abrading said hulls from said pistachio nuts by means of the surface having projections and the surface of said means having slots contacting said hulls while said unhulled pistachio nuts pass between said surface having projections and said surface of said means having slots.

3. A method of removing hulls from pistachio nuts said method comprising the steps of:

(a) depositing unhulled pistachio nuts between a movable belt having projections extending outward from a surface thereof and a means having slots, said projections being spaced apart on said surface and said surface movably mounted on support means with said surface having projections disposed in close proximity to [the] *a* surface of said means having slots so that the projections extend into the slots, said slots being narrower than said pistachio nuts;

(b) passing said unhulled pistachio nuts between said surface having projections extending therefrom and [a] *the* surface of said means having slots by means of moving said surface having projections so as to push said unhulled pistachio nuts in said slots with said projections; and abrading said hulls from said pistachio nuts by means of the surface having projections and the surface of said means having slots contacting said hulls while said unhulled pistachio nuts pass between said surface having projections and said surface of said means having slots.

* * * * *